Jan. 20, 1959     D. D. ZEBLEY     2,869,709
CONVEYOR CONSTRUCTION
Filed April 1, 1957     3 Sheets-Sheet 1
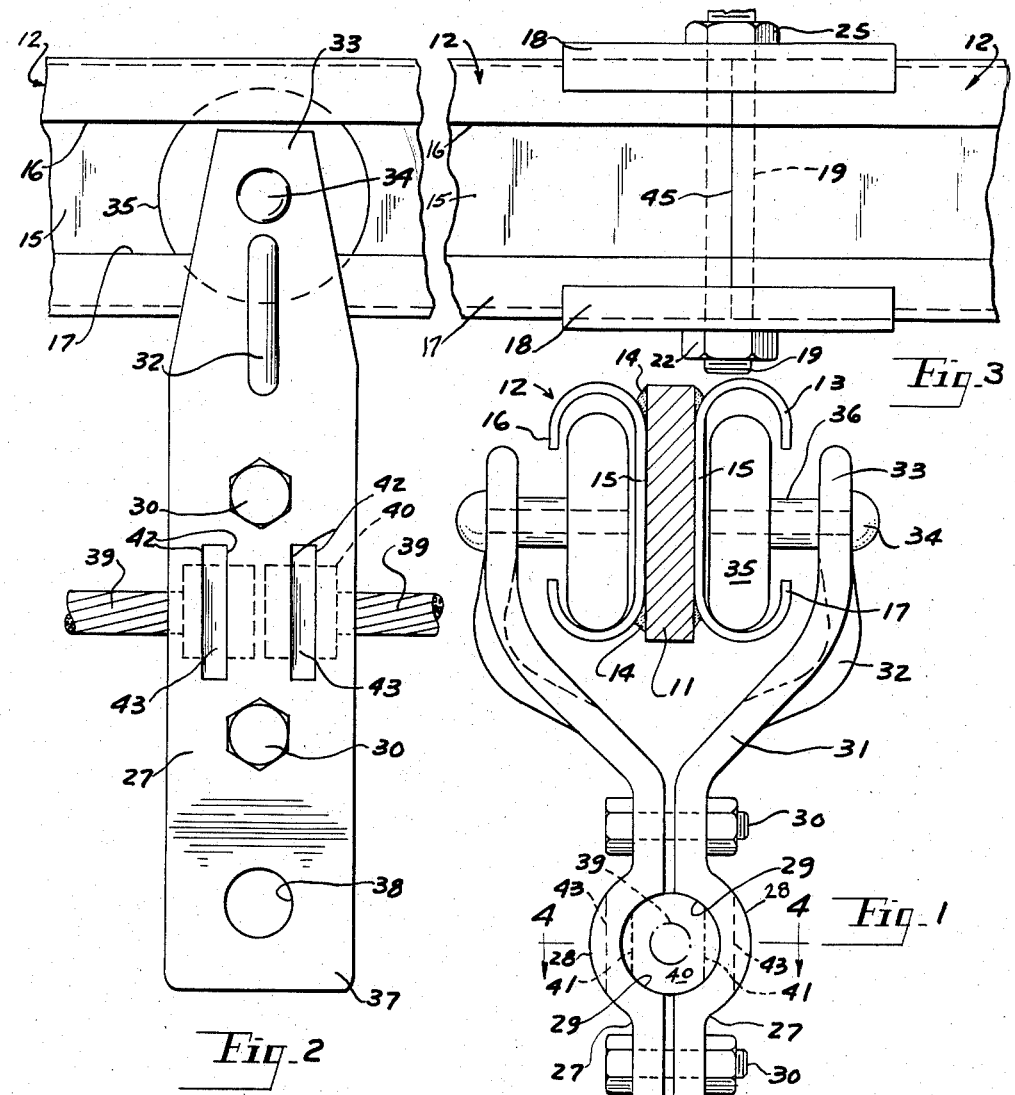
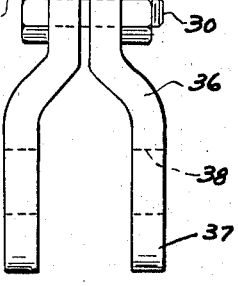
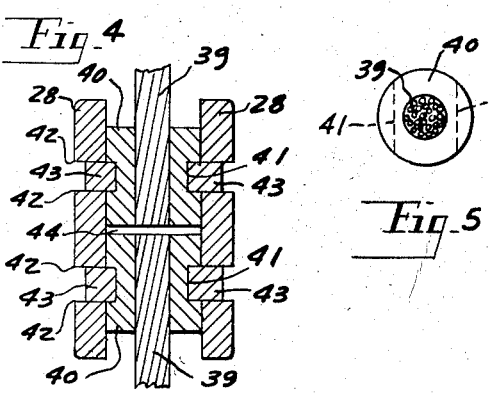
INVENTOR.
DONALD D. ZEBLEY
BY
Robert A. Sloman
ATTORNEY Jan. 20, 1959 D. D. ZEBLEY 2,869,709
CONVEYOR CONSTRUCTION
Filed April 1, 1957 3 Sheets-Sheet 2
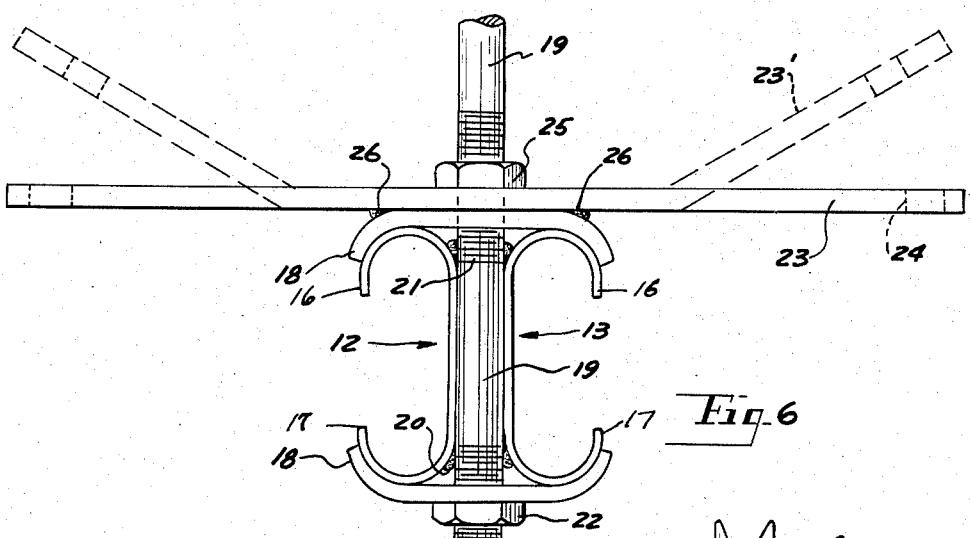
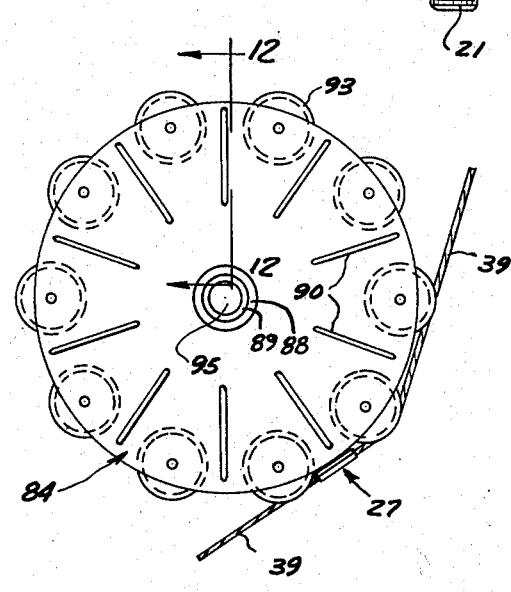
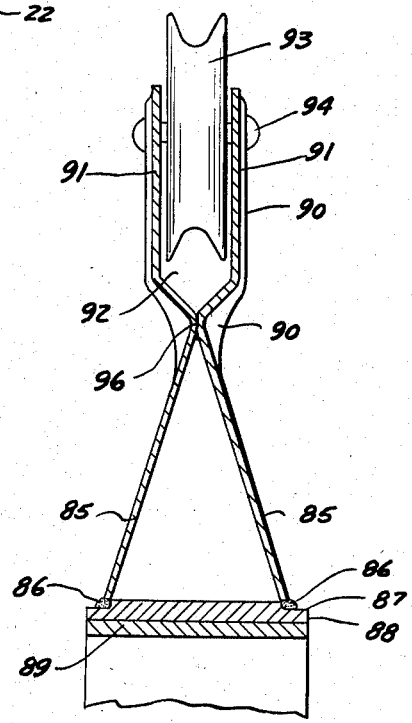
INVENTOR.
DONALD D. ZEBLEY
BY
Robert A. Sloman
ATTORNEY

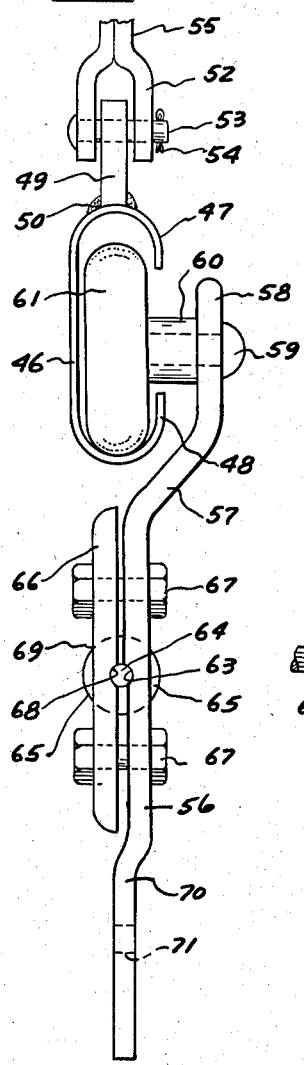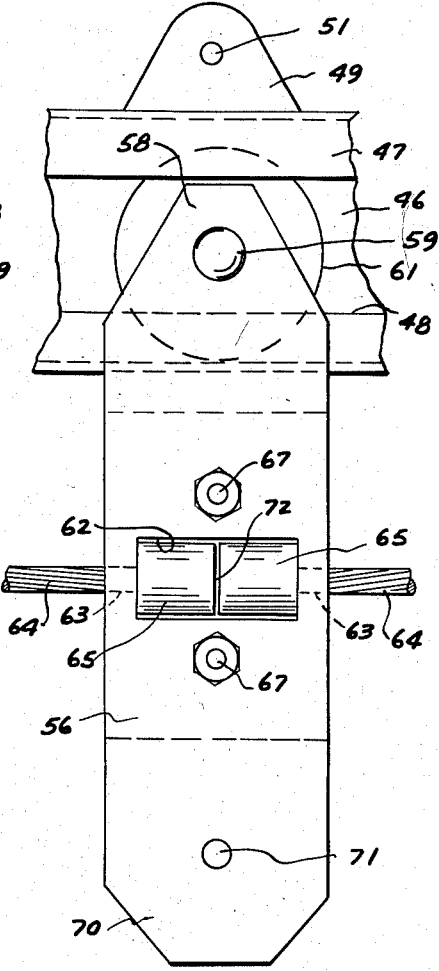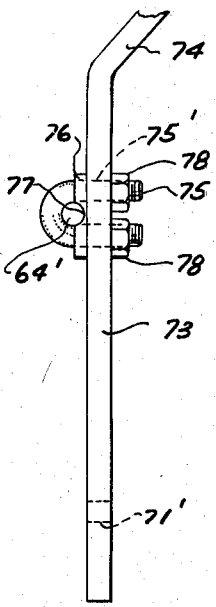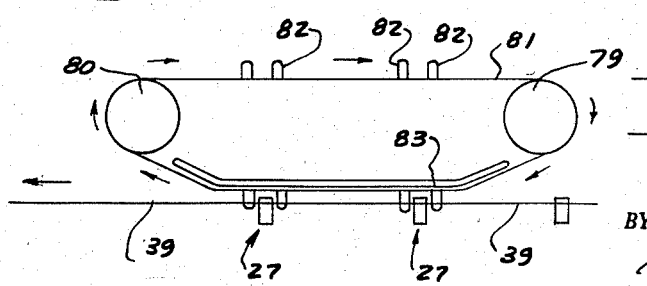
INVENTOR.
DONALD D. ZEBLEY
BY
Robert A. Sloman
ATTORNEY

United States Patent Office 2,869,709
Patented Jan. 20, 1959

2,869,709

CONVEYOR CONSTRUCTION

Donald D. Zebley, Detroit, Mich., assignor of one-half to Herman A. Sperlich, Highland Park, Mich.

Application April 1, 1957, Serial No. 649,837

2 Claims. (Cl. 198—177)

This invention relates to conveyors and more particularly to a trolley conveyor construction.

It is the object of the present invention to provide a plurality of pairs of identical stampings making up the series of spaced brackets for the present conveyor system.

It is the further object to provide a conveyor system which consists of a series of relatively short cable sections with cylindrical enlargements secured upon the opposite ends thereof and with the brackets constructed for splicing the adjacent ends of a pair of cable elements and in this fashion making up a complete conveyor system.

It is the further object of the present invention to provide a novel form of wheel track for movably mounting and suspending the series of load carrying conveyor brackets, which at the same time serve as a means of splicing the cable elements together.

It is the further object of this invention to provide a very simple light weight trolley conveyor system which consists of a single stamping corresponding to each conveyor bracket together with a cooperative locking plate for immovably securing said brackets in a series to spaced portions of a conveyor cable or to the respective adjacent ends of a series of aligned cable elements for splicing these elements together and at the same time securing the conveyor brackets to the said spliced cable elements and incorporating means for movably mounting the assembly from an overhead track.

It is the further object to provide novel form of floating wheel type of turn guide for the present conveyor.

These and other objects will be seen from the following specification and claims in conjunction with the appended drawings in which:

Fig. 1 is an end elevational view of a conveyor bracket assembly as suspended from an overhead track, a portion of which is shown in section for illustration.

Fig. 2 is a left side elevational view thereof, fragmentarily showing the track and the cable elements.

Fig. 3 is a fragmentary side elevational view illustrating the splicing of a pair of registering track elements.

Fig. 4 is a section taken on line 4—4 of Fig. 1.

Fig. 5 is an end view of one of the cable elements showing the cylindrical button thereon.

Fig. 6 is a fragmentary end elevational view illustrating the support for the overhead track.

Fig. 7 is a fragmentary diagram of the caterpillar drive for the present conveyor.

Fig. 8 is an end elevational view of a slightly different form of light weight trolley conveyor assembly.

Fig. 9 is a side elevational view thereof.

Fig. 10 is a side elevational fragmentary view of a slightly different form of trolley conveyor.

Fig. 11 is an elevational view of a floating wheel type of turn or guide for the conveyor system.

Fig. 12 is a fragmentary section taken on line 12—12 of Fig. 11, but on an enlarged scale.

It will be understood that the above drawings illustrate several preferred embodiments of the invention, and that other embodiments are contemplated within the scope of the claims hereafter set forth.

Referring to the drawings, Figs. 1 and 2 illustrate the opposed symmetrical brackets 27 which form the independent load bearing conveyor elements.

The overhead track consists of a series of longitudinal extending standard sections. These include the upright rectangular shaped reinforcing bar 11 and arranged upon opposite sides thereof the pair of opposed upright wheel support channels 12 and 13, suitably secured thereto as by the welds 14.

Each of the said channels includes the central upright plate 15 whose upper longitudinal portion is reverse turned and semicircularly curved at 16 throughout the length of the track. The lower longitudinal portion of plate 15 terminates in reverse turned opposed semicircularly shaped wheel supports 17 for wheels 35.

Fig. 3 illustrates the present method of supporting the overhead track and for splicing together aligned sections thereof. In Fig. 3 there are shown a pair of aligned track sections 12 which meet along the upright line 45 and which are secured together by the elongated opposed stamped plates 18, Fig. 6, whose outer edges are curved inwardly to cooperatively engage over the curved portions 16 and 17 of the track elements.

The upright bolt 19 threaded as at points 21 extends through corresponding apertures in the track engaging plates 18 and is suitably secured thereto by the nuts 22 and 25 of Fig. 6. Additionally the supporting bolts 19 are secured to interior portions of tracks 12 and 13 as by the welds 20.

At spaced portions of the said track there are arranged transverse anti-sway braces 23—23' which are retained above the track and upon the track engaging retaining plates 18 by the bolt 19 and nut 25, and are additionally secured to plates 18 by the welds 26. These plates adjacent their ends are apertured at 24 providing a convenient means of anchoring the same to some portion of the building structure for the purpose of preventing swaying of the conveyor track. The ends of plates 23 may be turned angularly upward as at 23' if desired to facilitate attachment.

Referring to Figs. 1 and 2 there is shown an individual conveyor element which consists of a pair of opposed symmetrical brackets 27 which are preferably stampings, being a low cost method of manufacture, and which take the shape shown.

Intermediate portions of upright plates 27 are semicircularly curved outwardly at 28, and being a plate of uniform thickness, thereby define the pair of semicylindrical recesses 29 arranged in opposed relation as a means of joining the cable ends to the said brackets in the manner hereafter described. Plates 27 are secured together in spaced relation by the bolts and nuts 30 arranged above and below central arcuate portions 28.

The plates 27 above the upper bolt taper upwardly and outwardly at 31 with reinforcing ribs 32 and terminate in the upright extensions 33 upon which the supporting rollers 35 are journaled and retained. For this purpose suitable rivets 34 are employed upon which the wheels 35 are journaled and retained with a suitable bushing 36 spacing the wheels from the corresponding plate extension 33.

A pair of said wheels 35 are so arranged as to movably nest within the opposed channels 12 and 13 which provide the overhead track above described and by which the series of conveyor elements are movably mounted and suspended.

Plates 27 below the lower bolts 30 are tapered outwardly as at 36 and terminate in the laterally spaced load supports 37 transversely apertured at 38.

The present conveyor while it might be made up of a unitary cable having secured thereon a series of cylindrical buttons for securing to the respective opposed bracket elements, nevertheless in the preferred embodiment consists of a series of cable sections 39 of a uniform predetermined length, such as 12 or 18 inches.

Cylindrical buttons 40 are suitably secured as by swaging upon the respective ends of each cable section 39, as shown in Figs. 2 and 4. These buttons have in their opposite sides the opposed parallel slots 41 adapted to receive the retaining keys 43 which form an integral part of plates 27.

This assembly is illustrated in Figs. 1, 2 and 4. Here the arcuate portions 28 in plates 27 have formed therethrough a series of upright slits 42 or inwardly lanced portions. The metal of the said plate between said lances is pressed inwardly defining the retaining keys 43 which remain a part of the said plates and are snugly received within the opposed upright notches 41 formed in the end buttons 40 on the cable elements.

The plates 27 are brought together enclosing within arcuate members 28 the pair of buttons 40 on the ends of the adjacent cable elements 39 with a slight space 44 therebetween if desired. Said plates are immovably secured together by the bolts and nuts 30 completing the assembly. This, not only splices the cable elements together, but effectively secures the upright plates 27 together and with respect to their supporting rollers or wheels 35 completing the conveyor assembly.

Light weight trolley assembly

A slightly different form of conveyor assembly is shown in Figs. 8 and 9 of a light weight construction, and distinguishable from the above described conveyor assembly in that the respective conveyor element is supported by a single roller 61, movably mounted upon a horizontally elongated channel track 46 similar to channels 12 and 13, Figs. 1 and 2.

Track 46 in Fig. 8 has at its top and bottom the longitudinally expanding opposed reverse turned semicircularly shaped track elements 47 and 48, with the roller 61 movably supported loosely upon lower track 48.

As one means of support for track 46 there are provided a series of longitudinally spaced brackets 49 welded to upper portions of the track at 50 and transversely apertured at 51. The track is supported at a series of horizontally spaced points by the mounting brackets 55 whose lower bifurcated ends 52 loosely receive brackets 49 and are secured thereto by the transverse headed pin 53 and the retaining cotter-pin 54.

The conveyor mechanism consists of a series of longitudinally spaced upright cable engaging brackets, one of which is shown. This light weight trolley assembly consists of the formed upright plate 56 which towards its upper end has an outwardly tapered upwardly extending portion 57 terminating in the upright extension 58. Rivet 59 and spacing bushing 60 effectively journal and mount the roller or wheel 61 adapted to move within the open channel track 46.

The central upright flat portion of plate 56 has formed therethrough the horizontally extending rectangular aperture 62. Said plate also has formed upon one side and beyond the ends of aperture 62 the arcuate slots 63 adapted to cooperatively engage portions of the cable elements 64. The slots 63 may be serrated, if desired to increase frictional contact with the cable elements. Each of the individual cable elements 64 have secured upon their ends cylindrical buttons 65, which as shown in Fig. 9, are in longitudinal registry as at 72 and are nested so as to project laterally through the bracket aperture 62, as shown in Fig. 8.

The assembly is completed by the upright retainer plate 66 which is secured to plate 56 in parallel spaced relation by a pair of bolts and nuts 67 arranged above and below cable buttons 65. Plate 66 also has formed therethrough a rectangular aperture 69 corresponding to aperture 62 and in opposed relation thereto and through which portions of the buttons 65 laterally extend in the same manner. Outer portions of plate 66 upon its interior beyond the aperture 62 are arcuately slotted at 68 opposing the slots 63 adapted to cooperatively receive cable elements 64. Slots 68 may be serrated if desired.

By this construction there is provided a very simple and effective means of splicing cable elements 64 together by a simple trolley conveyor mechanism which includes plates 56 and 66 bolted together at 67.

The lower portion of plate 56 is laterally offset as at 70 so as to be in vertical registry with the vertical axis of roller 61 and thus defines with the transverse aperture 71 means for supporting a load and for moving the same throughout the length of the conveyor track.

A slightly different form of conveyor assembly is fragmentarily shown in Fig. 10, which consists of a single upright stamped plate 73 having towards its upper end an upwardly and outwardly tapered portion 74 corresponding to member 57 in Fig. 8. This plate is broken off, but is of exactly the same construction as shown in Fig. 8 at its upper end with regard to the wheel mounting and it is supported upon a track similar to track 46. Also the lower end of plate 73 is transversely apertured at 71' providing means for suspending a load.

This trolley assembly utilizes a conventional type of cable clamp which includes a recumbent U-shaped bolt 75, threaded at both ends, whose bight retainingly extends around a portion of cable 64'. Apertured gripping plate 76 receives the free ends of bolt 75 and has an internal slot 77 adapted to cooperatively and retainingly engage opposing portions of the cable. The bolt ends 75' extend through plate 73.

The assembly is completed by the application of nuts 78 whereby the load carrying plate 73 or conveyor element is effectively secured to a portion of the movable cable 64'.

Fig. 7 diagrammatically indicates in plan a caterpillar type of drive which is preferably used in effecting feeding of the present conveyor assembly i. e., either that shown in Figs. 1, 9 and 10.

Sprocket chain 81 is movably mounted and extends around the drive sprocket 79 which is power operated and the spaced takeup sprocket 80. Said chain has secured thereto throughout its length at spaced portions corresponding to the center distance between trolley conveyor elements, a series of outwardly projection pairs of conveyor engaging lugs 82. These are adapted to loosely yet operatively engage in driving relation end wall portions of the plates 27 adjacent the cable elements 39.

In the case of the conveyor assembly shown in Fig. 9, the lugs are adapted to operatively engage central edges of the plate 56 adjacent cable elements 64. By this construction the spliced cable elements with their associate trolley conveyors are effectively moved along the length of the overhead supporting track.

A formed guide 83 is also employed horizontally spaced from the plane of the cable elements 39 over which movably extends the sprocket chain 81 for maintaining said chain in close operative engagement with the trolley conveyor assemblies as they are moved horizontally.

Figs. 11 and 12 illustrate the turn wheel 84 over which the cable elements 39 and their associated trolley conveyor elements move in the desired direction.

Turn wheel 84 is constructed from a pair of circular centrally apertured opposed plates 85. The inner edge portions of said plates bounding the aperture therein overlie the shoulder 87 of hub 88 and are suitably welded thereto or otherwise secured as at 86. A suitable bushing 89 is retained within hub 88 and is journaled over the support shaft 95, Fig. 11.

Outer contacting portions of plates 85 are suitably secured together as by the welds 96. These portions terminate in the annular parallel spaced peripheral extensions 90 which define around the wheel the annular trough or groove 92. The peripheral plate elements 91 are reinforced by the series of radial ribs 90. A series of pulley wheels 93 are arranged around the periphery of wheel 84 partially within the annular groove 92 and journaled and retained therein by the series of spaced rivets 94.

A portion of each of the pulleys 73 projects beyond the periphery of the wheel assembly 84 in order to cooperatively receive portions of the cable elements 39, as shown in Fig. 11.

The centers of the pulleys 93 are so spaced as to provide an adequate clearance for the conveyor assemblies 27, which will move between the said pulleys as the cable assembly movably extends around said turn wheel.

As all cables subject to load are capable of some yielding or stretching, the spacing between pulleys 93 is such that should there not be an exact registry of the conveyor assembly 27 between a pair of wheels then the said assembly would in effect roll into such space, being guided over the individual pulleys 93 carried by the main wheel 84.

Accordingly the present turn wheel 84 is constructed to compensate for any slight change in length or distance between conveyor centers, by spacing portions of adjacent pulleys a distance greater than the width of the conveyor assembly 27.

Having described my invention I claim:

1. In a conveyor movably mounted upon an overhead track and including a series of aligned short cable elements; enlarged cylindrical buttons secured on the ends of said cable elements, a pair of opposed upright load carrying bracket plates depending from said track, opposed central transverse portions of said plates being curved outwardly defining a horizontally elongated cylindrical recess receiving therein a pair of buttons and their associated cable elements, interlocking projections and recesses formed in said buttons and curved portions, and fastening means interconnecting said plates above and below said curved portions, said interlocking projections and recesses including upright slots formed in the outer surfaces of each button, there being a series of upright slits formed through said curved portions defining therebetween inwardly projecting keys nested within the button slots.

2. In a conveyor adapted for movable mounting on and suspension from an overhead track, a pair of aligned cable elements, enlarged cylindrical buttons secured on the ends of said cable elements, a pair of opposed upright load carrying plates, transverse substantially semicircular outwardly curved central members on said plates defining horizontally elongated cylindrical opening receiving therein said pair of buttons and associated cable elements, there being upright slots formed in the outer surface of each button, inwardly projecting lugs upon the interior of said central members retainingly nested within said button slots, and fastening means interconnecting said plates above and below said curved portions.

References Cited in the file of this patent

UNITED STATES PATENTS

| | | |
|---|---|---|
| 618,642 | Clouser | Jan. 31, 1899 |
| 978,581 | Hamilton | Dec. 13, 1910 |
| 1,704,150 | Riley | Mar. 5, 1929 |
| 1,811,270 | Henderson | June 23, 1931 |
| 2,633,226 | Vogt | Mar. 31, 1953 |
| 2,702,114 | Jensen | Feb. 15, 1955 |
| 2,714,442 | Klamp | Aug. 2, 1955 |
| 2,765,068 | Daigle | Oct. 2, 1956 |
| 2,766,873 | Brown | Oct. 16, 1956 |